United States Patent [19]

Mocquart et al.

[11] Patent Number: 4,586,529
[45] Date of Patent: May 6, 1986

[54] BALL LAUNCHER FOR STANDARD TUBE FOR MONITORING A VOLUME METER

[75] Inventors: Jacques M. Mocquart, La Varenne; Alain Y. Dang, Suresnes, both of France

[73] Assignee: Societe des Transport Petroliers par Pipe-Line, Paris, France

[21] Appl. No.: 630,248

[22] Filed: Jul. 12, 1984

[30] Foreign Application Priority Data

Jul. 21, 1983 [FR] France ................ 83 12060

[51] Int. Cl.⁴ ............................................. G01F 25/00
[52] U.S. Cl. ............................. 137/268; 15/104.06 A
[58] Field of Search ............... 137/268; 15/104.06 A; 73/3; 251/85

[56] References Cited

U.S. PATENT DOCUMENTS

| | | |
|---|---|---|
| 3,169,263 | 2/1965 | Eagleton . |
| 3,182,951 | 11/1965 | Spencer ................................ 251/85 |
| 3,738,153 | 6/1973 | Simmons ................................ 73/3 |
| 3,963,211 | 6/1976 | Myers ................................ 251/86 |
| 4,268,932 | 5/1981 | Hogan ................................ 137/268 |

FOREIGN PATENT DOCUMENTS

| | | |
|---|---|---|
| 0028575 | 5/1981 | European Pat. Off. . |
| 2112313 | 6/1972 | France . |
| 2217249 | 9/1974 | France . |
| 2317636 | 2/1977 | France . |

*Primary Examiner*—Alan Cohan
*Attorney, Agent, or Firm*—Stevens, Davis, Miller & Mosher

[57] ABSTRACT

The invention relates to a ball launcher constituted by a body having an opening for receiving the ball and an opening for introducing the ball at the inlet of the loop, and comprising a valve cooperating with a seat, wherein said valve is fast in rotation with a pin located at a distance from this valve and parallel to its plane, and it may thus move inside the launcher between two end positions, said valve being hermetically applied against the seat in its first end position, and allowing the ball to abut on said seat in a second end position, the return of the valve to its first end position ensuring forced passage of the ball through the seat. The invention is more particularly applicable to the calibration of volume meters.

6 Claims, 7 Drawing Figures

BALL LAUNCHER FOR STANDARD TUBE FOR MONITORING A VOLUME METER

The present invention relates to a sphere or ball launcher adapted to be used in standard tubes for monitoring volume meters.

Such monitoring standards generally include a calibrated pipe loop comprising the meter to be verified, and in which is launched a ball which is taken along with the circulating fluid. The two ends of said loop are connected by a transfer device making it possible to pass the ball from the outlet to the inlet of the loop, or for initially introducing it into the circuit. Certain standards provide that, during the meter monitoring phase, the transfer device is hermetically closed with the aid of a valve obturator.

Different types of monitoring standards are already known.

Of these, standards not providing a valve obturator in the transfer device will not be evoked further, as it is difficult to monitor the tightness of this device, and such monitoring is important to validate the test of the meter to be checked. Furthermore, standards exist of which the transfer device comprises two valves, one being allocated to the introduction of the ball at the inlet of the loop, the other to the recovery of this ball at the outlet of the loop. This system makes it possible to introduce the ball at the inlet of the loop by gravity. Systems also exist, incorporating a cage and provided with a valve, in which the ball is introduced at the inlet of the loop with the aid of this cage, the valve obturator closing simultaneously.

Another system, described in French Patent No. 2 112 313, simplifies the previous systems. This system comprises only one valve, and does not require a cage for receiving the ball at the outlet of the loop, this outlet being isolated from the main fluid circulation pipe. This valve is moved for example by means of a linear jack, and, in addition to the function of tightness, ensures that of transferring the ball from the outlet to the inlet of the loop.

The principal drawbacks of this system are connected with the linear mode of actuation of the valve. The central manoeuvring rod renders it difficult to introduce the ball into the transfer device. The ball arriving from the outlet of the pipe loop in the transfer device tends to block the rise of the valve and it is therefore necessary to provide an auxiliary mechanism for retaining the ball, such mechanism being indirectly controlled by the valve actuation system, therefore subject to operational hazards.

Another drawback associated with the linear operational structure of this system is the resulting dimensions, since a member necessarily moves outside the transfer device in a stroke equivalent to that of the valve inside. This requires the construction of a special, large-volume, pressure-resistant envelope, which is not without influence on the cost of such a system.

Another drawback of this system is that of having to apply a continuous pressure on the valve in order to obtain a good seal.

A further drawback of this system is that the mechanical assembly comprising the valve and its manoeuvring rod is rigid. Such a mechanism brings about stresses during assembly, as it tolerates neither defects in alignment nor clearances. The use of an electric motor, for example, for actuating the manoeuvring rod of the valve, by reason of the imprecise ends of strokes that it may involve, can therefore hardly be used in this system. Manufacture of the transfer device must be highly precise. All these servitudes influence the cost of such a system.

According to the invention, all these problems are solved by the fact that the sphere or ball launcher for a standard tube for monitoring volume meters, adapted to transfer a ball from the outlet end of a pipe loop to its inlet end, constituted by a body having at least one opening for receiving said ball and an opening for introducing the ball at the inlet of said loop, and comprising at least one valve cooperating with a seat, is such that said valve is fast in rotation with a pin located at a distance from this valve and parallel to its plane, that it may thus move inside the launcher between two end positions, said valve being hermetically applied against the seat in its first end position, and allowing the ball, mobile inside the body, to abut on said seat in a second end position, the return of the valve to its first end position ensuring forced passage of the ball through the seat.

The invention will be more readily understood on reading the following description with reference to the accompanying drawings, in which.

Figure 1:
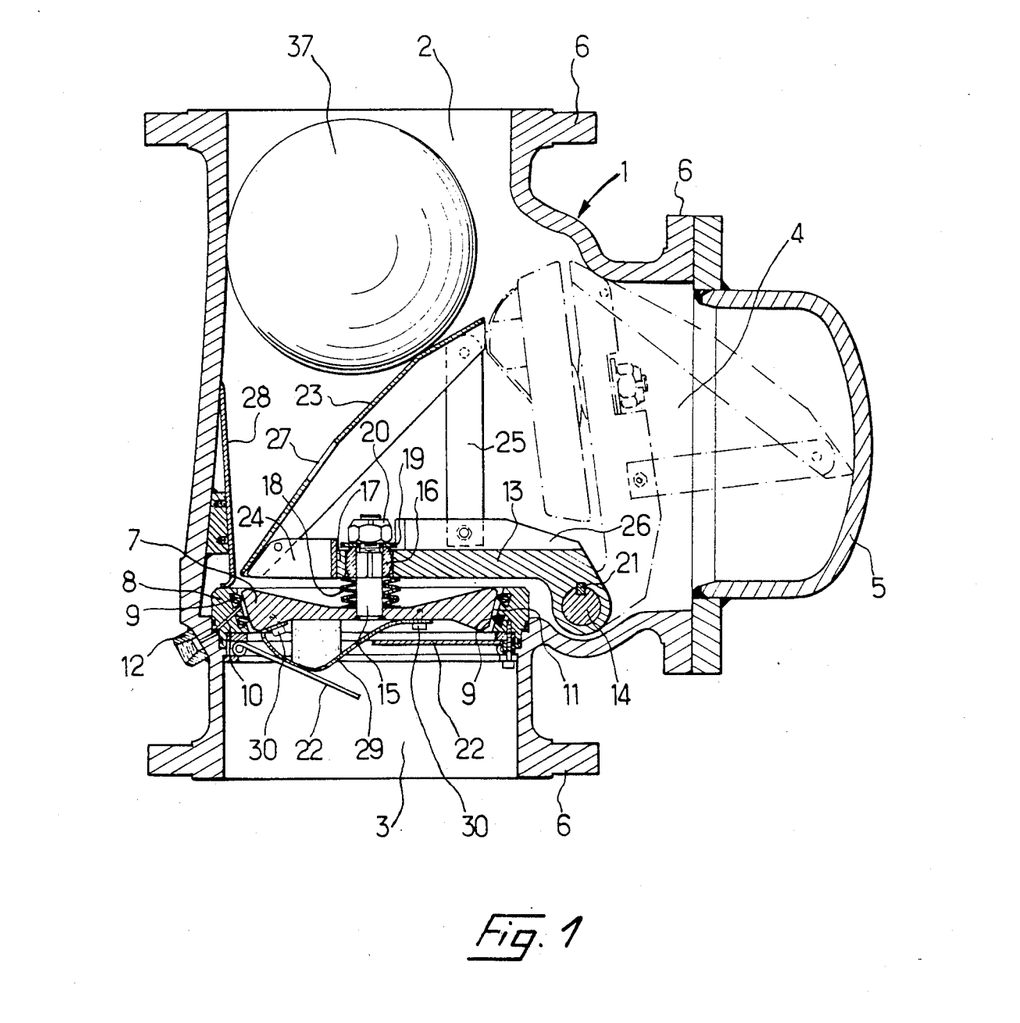
FIG. 1 is a transverse section through the ball launcher according to the invention, in the position prior to the launching of the ball.

Referring now to the drawings, FIG. 1 shows the ball launcher according to the invention, in vertical position. It is constituted by a body 1 which will advantageously be a standard valve body found on the market. It is a T-shaped body having three circular openings 2, 3 and 4. Opening 2 is adapted to be connected to the outlet end of a calibrated pipe loop (not shown), and opening 3 to the inlet end thereof.

Each of the three openings 2, 3, 4 has a flange 6 for fixation to outside pipe elements. Opening 4 is fitted with a rapidly opening gate 5 which closes hermetically on the flange 6. The body 1 is fitted with an inner valve 7, shown in the present case hermetically applied against a seal 8 due to the presence of two O-rings 9 embedded in two grooves made in the seat. The valve 7 is conical in form and is applied on a corresponding shape of the seat 8. Several conduits 10, provided in the seat 8, connect the zone 11, included between the two O-rings 9 and the surface of the seat 8 abutting thereon, with an outside connector 12. In order to control the displacement of valve 7 from the position that it occupies in FIG. 1 up to that shown in broken lines, said valve is rendered fast with a lever 13, itself fast in rotation with a drive pin 14. The volume delimited by the body 1 and the gate 5 is sufficient to allow displacement of the valve. The valve 7 is connected to lever 13 by a rod 15 fixed for example by welding at the centre of the valve 7. This rod 15 is provided with an added double square coupler 16 which may move in translation in a square female socket 17 provided at one of the ends of the lever 13. Moreover, the clearance provided between the squares 16 and 17 allows slight rotation of the valve 7. The lever 13 is elastically maintained at a distance with respect to the valve 7 by a stack of Belleville type washers 18, mounted on rod 15, between valve 7 and square 16. These washers 18 push the female square 17 of the lever 13 against a stop washer 19 mounted on the rod 15, and immobilized against square 16 by a nut 20. They also prevent rotation of the valve 7 in its plane. The end of lever 13, opposite that comprising the female square 17, is bent and perforated so as to be mounted on the drive pin 14. This pin 14 is located in the plane of the seat 8, and is maintained by bearings (not shown) on the body 1. A key 21 renders the pin 14 and lever 13 fast in rotation. The pin 14, which hermetically opens out outside the body 1, may be a shaft of an electric gear-down motor for example, the motorization (not shown) being fixed on the outer wall of the body 1. Beneath the seat 8 is mounted a valve 22 incorporating sectors, known per se. It comprises for example six flaps which are downwardly mobile and elastically returned towards their horizontal stop position. In this latter position, they oppose any fluid which might rise via opening 3 through the seat 8, by offering it minimum passage. On the other hand, they will pivot during forced passage, for example of ball 37, downwardly.

Several deflectors for guiding the sphere are provided in the launcher according to the invention. A deflector 23 for retaining the sphere 37 is fast with lever 13. Lever 13 has an arm 24 fixed to the base of the deflector 23 and enabling the latter to be maintained. The deflector 23, which may pivot with respect to arm 24, is maintained in raised position by an upright 25 fixed in the upper part of the deflector 23, so as to be pivotable. Upright 25 is fixed at its base on a rib 26 of the lever 13, so as to be dismountable. In this way, the deflector 23 may be bent down on lever 13. The deflector 23 is advantageously convex in form and is also provided with a perforation 27 allowing the nut 20 to come level with its surface, so that it may be bent down to a horizontal position. A fixed deflector 28, screwed on the inner wall of the body 1, and coming level with the inner edge of the seat 8, makes it possible to guide the ball 37 in its drop towards this seat. A third deflector 29 is fixed on the lower face of valve 7 by screws 30. Of shape adapted to that of ball 37, it promotes thrust of said ball through the seat 8.

Figure 2:
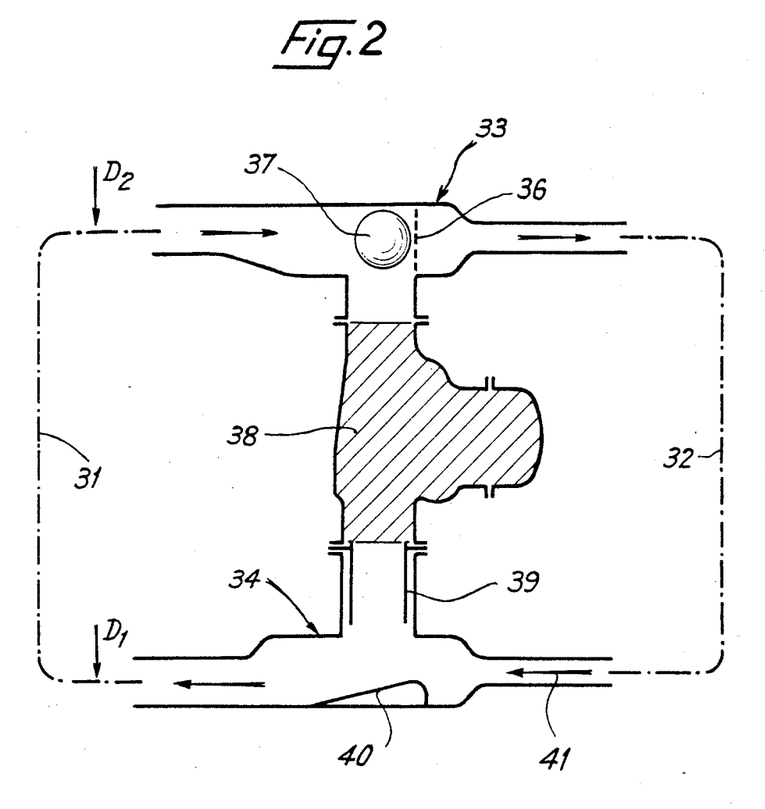
FIG. 2 is a diagram of the standard loop according to the invention, shown vertically.

FIG. 2 illustrates a standard loop according to the invention, showing a calibrated pipe loop 31 and a pipe loop 32 comprising the apparatus to be tested. These two loops are connected to each other at the top by a tee 33 and at the bottom by a tee 34. Tee 33 is provided with a separator 36 on the loop 32 side, allowing the fluid to pass whilst being able to retain the ball 37. In known manner, a ball detector D1 is disposed at the inlet of the loop 31, after tee 34, and a detector D2 is disposed at the outlet thereof, before tee 33. The launcher 38 according to the invention is connected by its inlet beneath this tee 33 and by its outlet to tee 34. A sleeve 39 is advantageously provided immediately at the outlet of the launcher 38 in order to slow down ball 37 in its drop, which makes it possible to reduce the dead length of pipe usually provided to this end, between tee 34 and ball detector D1. At the bottom of tee 34 there is fixed a deflector 40 inclined towards the calibration loop 31 and promoting introduction of the ball 37 in this loop. Arrows 41 indicate the direction of circulation of the fluid in the circuit.

Figure 3:
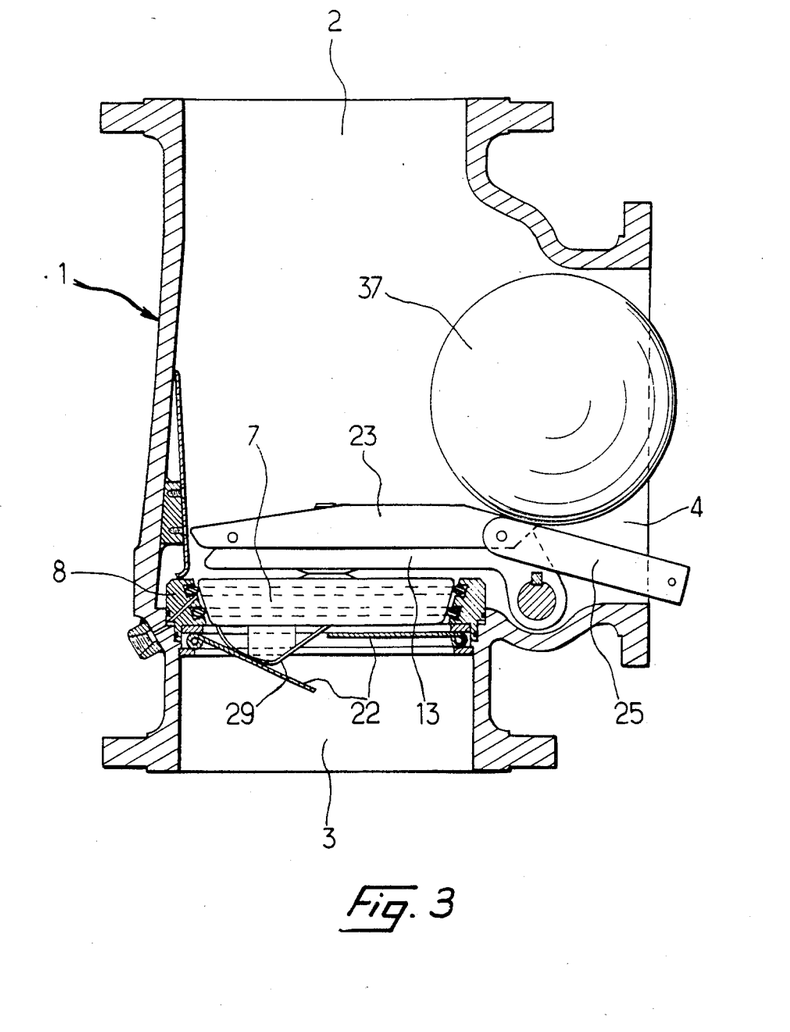
FIG. 3 is a section through the launcher, during introduction of the ball into the pipe.

Operation of the launcher according to the invention will now be explained in greater detail. The initial introduction of ball 37 into the circuit is effected as follows: the fast-locking gate 5 is withdrawn (FIG. 1) and the deflector 23 is folded down. To this end, the upright 25 is detached at its base. Deflector 23 may then be folded down as shown in FIG. 3. This deflector together with the upright 25 constitute a ramp for access on which ball 37 may roll. It then suffices to introduce the ball 37 into the body 1 via opening 4, to raise the deflector 23, which pushes the ball 37 towards opening 2, to reconnect the upright 25 at its base, and finally to raise the fast-locking gate 5. Ball 37 is then in abutment on deflector 23, as shown in FIG. 1.

It is sometimes necessary to take ball 37 out of the circuit. This removal takes place in reverse, the ball 37 being initially in abutment on the deflector 23, and leaving the body 1 by rolling on the ramp constituted by folded down deflector 23 and upright 25.

Once the ball 37 is introduced and disposed as shown in FIG. 1, the washers 18 being elastically compressed by lever 13, they transmit a permanent force to valve 7, this guaranteeing a good bearing of the latter on its seat 8. The drive system is simply blocked, and does not have to transmit a continuous force to lever 13, as in the prior art. The possibilities of pivoting of valve 7 with respect to lever 13 also ensure good seating of valve 7 on its seat 8, and make it possible to manufacture the different mechanical pieces of the launcher with fairly broad tolerances.

Figure 4:
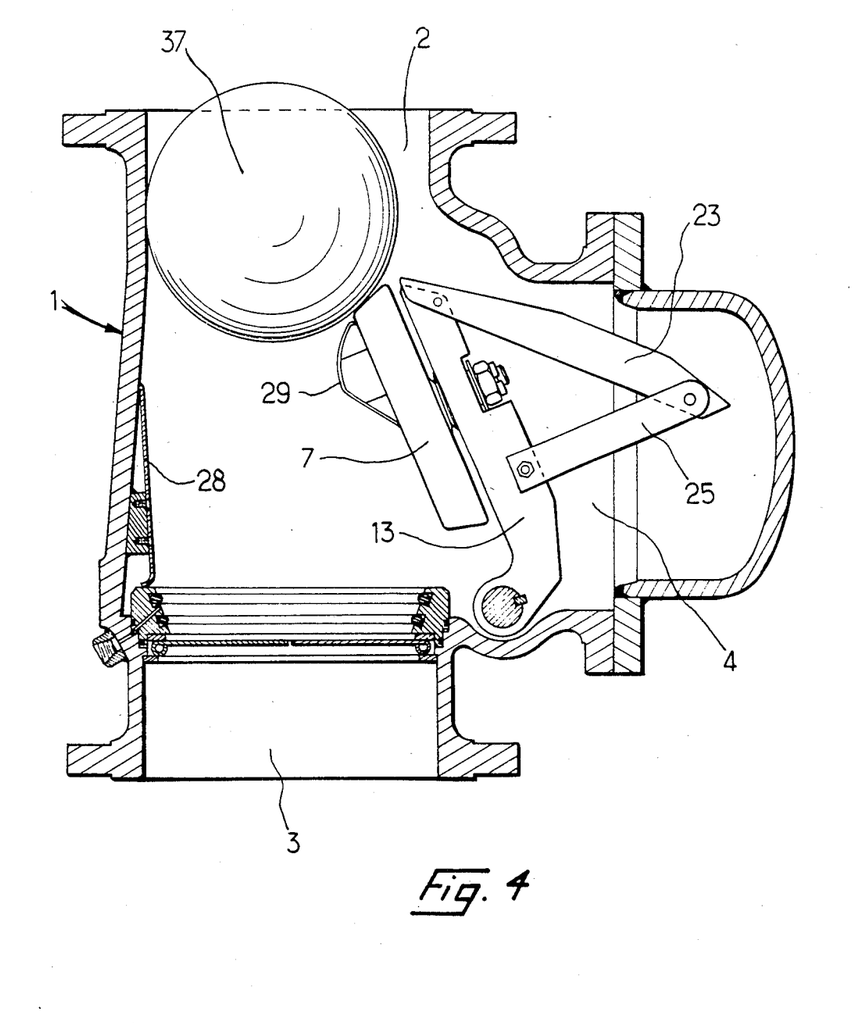
FIG. 4 is a section through the launcher, during pivoting of the launcher to allow the ball to pass.
Figure 5:
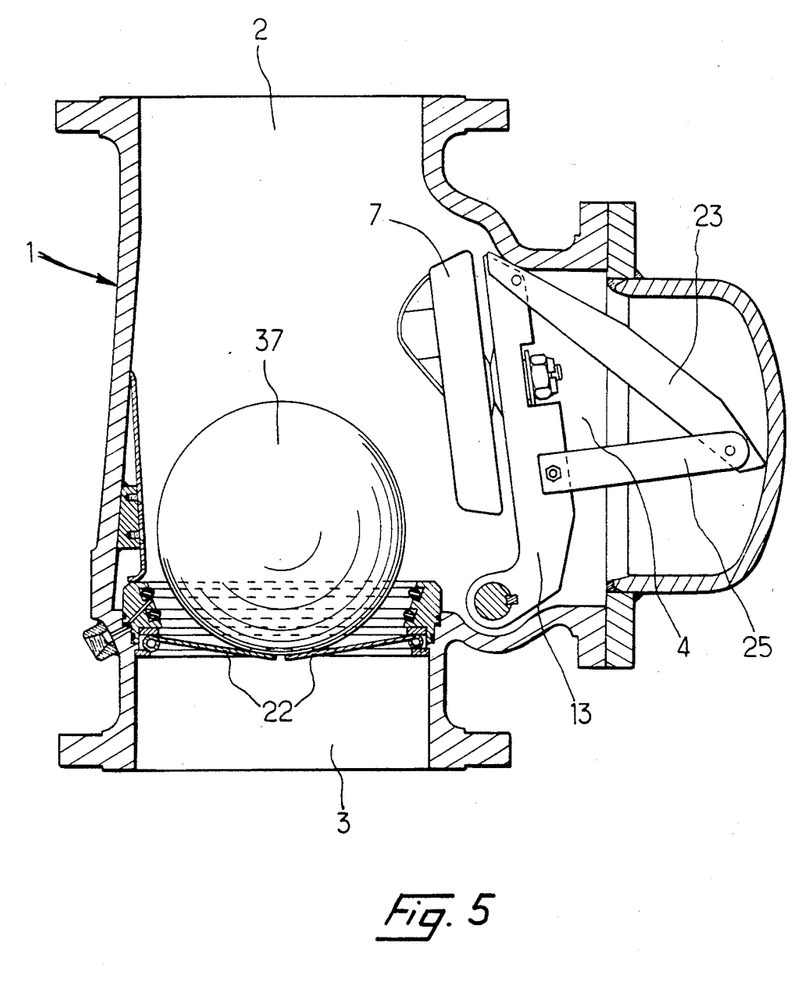
FIG. 5 is a section through the launcher, at the end of pivoting thereof.
Figure 6:
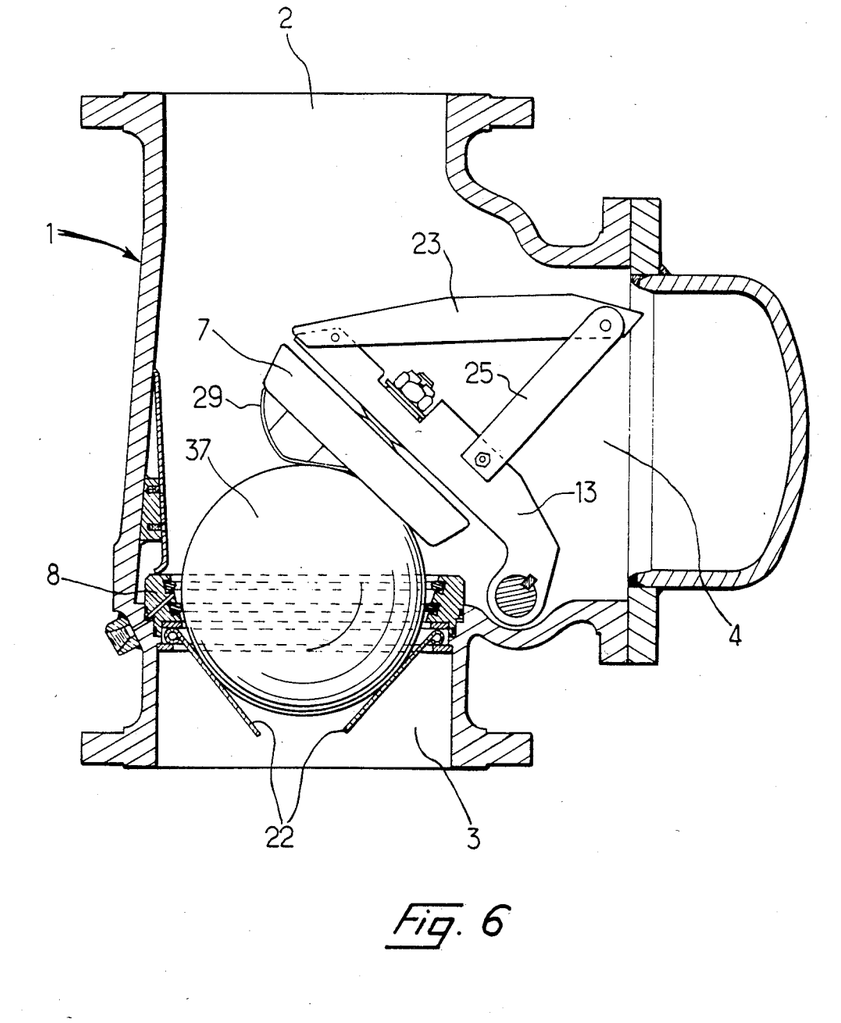
FIG. 6 is a section through the launcher, during launching of the ball.
Figure 7:
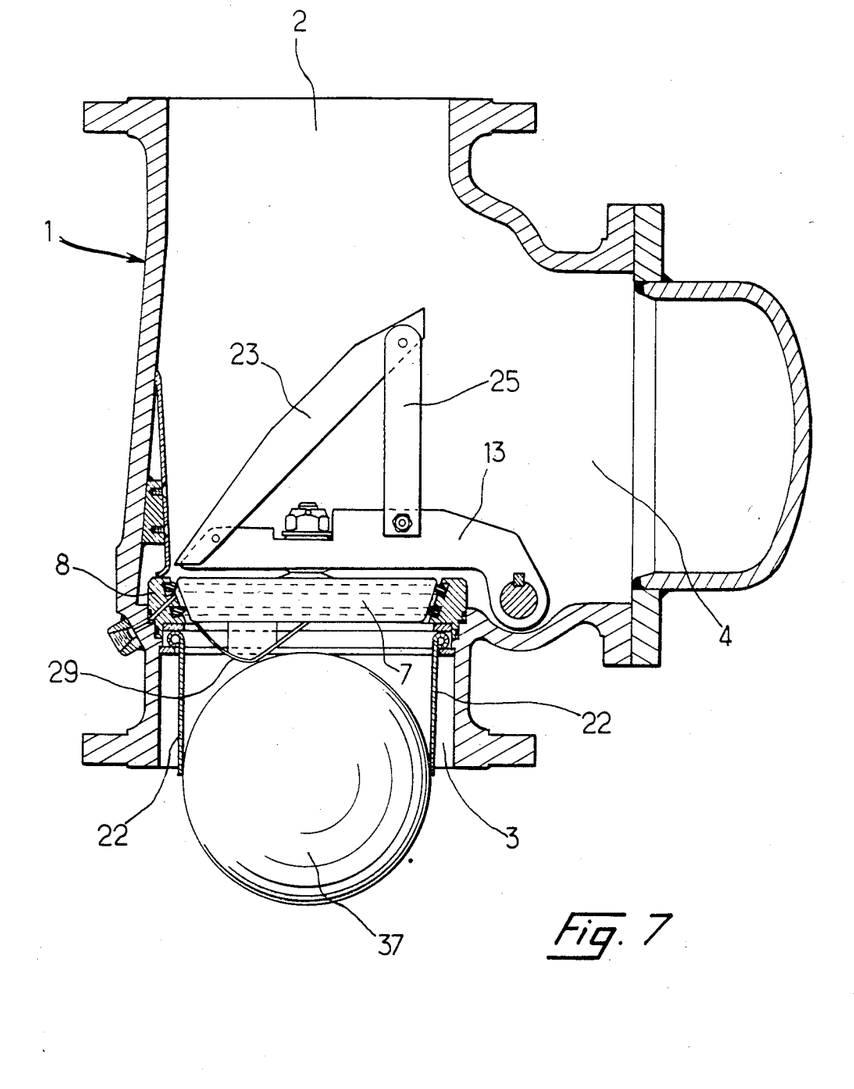
FIG. 7 is a section through the launcher, during closure of the valve.

The launcher must now be "set" to send ball 37 into the standard loop. Upward pivoting of lever 13 is then controlled by the drive device. An intermediate position is shown in FIG. 3 where ball 37 rolls over the outer surface of deflector 23, of valve 7 then of deflector 29, whose shapes are adapted to such rolling. After a pivoting of the lever 13 sufficient to allow ball 37 to pass, the latter, guided by deflector 28, comes into elastic abutment on the valve 22 incorporating sectors, as shown in FIG. 4. It will be noted that, unlike the prior art, the movement of rotation of the valve enables the risks of blocking of valve 7 by ball 37 to be easily overcome. During upward pivoting of valve 7, the fluid tends to penetrate through opening 3 into the launcher. However, valve 22 retains the major part of this flow, with the result that ball 37 does not risk being taken upwardly by the fluid. In the position of FIG. 4, the launcher is "set" to launch ball 37 in the standard loop. All that remains is to control pivoting of the lever 13 in the direction opposite the preceding one. An intermediate position is shown in FIG. 5. Ball 37, made of a deformable material and having a diameter slightly greater than the diameter of passage of seat 8 (of the order of 2% more), it must be passed through this seat by force. Transmission of the effort of thrust on ball 37 is promoted by the shape of deflector 29, which is adapted to that of ball 37. In FIG. 6, valve 7 is in abutment on seat 8. Ball 37 has completely passed through seat 8 and emerges at a certain speed from opening 3 of the launcher. According to FIG. 2, ball 37 is then slowed down by the sleeve 39, then it is guided by deflector 40 towards the calibration loop 31 where the actual measurement of calibration is effected.

Any defective tightness between valve 7 and its seat 8 is translated by variations in pressure in zone 11 (FIG. 1), which are transmitted via conduits 10 up to a connector 12 on which may be mounted a pressure controller which will enable such variations to be detected, particularly during the calibration phase.

At the outlet of the loop 31, ball 37 arrives at tee 33 where it is stopped by the separator 36, and drops by gravity into the launcher 38.

The invention is particularly applicable to the calibration of volume meters, especially when minimum dimensions are sought.

What is claimed is:

1. In a sphere or ball launcher for a standard tube for monitoring volume meters, adapted to transfer a ball from the outlet end of a pipe loop to its inlet end, constituted by a body having a first opening for receiving said ball from the outlet end of said pipe loop, a second opening for introducing the ball into the inlet of said pipe loop, and a side chamber located between said first and second openings, a valve within said body which is fixed with respect to rotation with a pin located at a distance from said valve and parallel to its plane, said pin moving said valve inside the body between a first end position and a second end position, a valve seat positioned within said body, said valve body hermetically applied against said seat in said first end position, and allowing the ball, the diameter of which is slightly larger than the interior diameter of said seat, to move by gravity inside said body, and abut said seat when said valve is in said second end position, said valve in said second end position being located in said side-chamber, the return of said valve to its first end position ensuring forced passage of the ball through said seat, the improvement comprising a deflector in the form of a ramp positioned on said valve on a face opposed to said seat, on which the ball abuts in the first end position of said valve, and on which the ball rolls when said valve moves to its second end position.

2. The ball launcher of claim 1, including an actuating lever to which said valve is connected, said valve being elastically mobile in translation with respect to said actuating lever.

3. The ball launcher of claim 2, wherein the connection between said valve and said actuating lever comprises a square coupler, and spring washers interposed between said valve and said lever.

4. The ball launcher of claim 1, including a deflector positioned on a valve face cooperating with said seat, the contour of which is adapted to that of the ball, and which is adapted to cooperate with the ball.

5. The ball launcher of claim 1, including a sleeve mounted on the body at said second opening, for slowing down the movement of said ball.

6. The ball launcher of claim 2, wherein said deflector in the form of a ramp is hinged on said lever and including a fast-locking gate provided on said side-chamber of the body for pulling the ball out of the body or inserting the ball in the body, as said deflector in the form of a ramp is pulled down.

* * * * *